United States Patent [19]

Richmond et al.

[11] Patent Number: 4,716,930
[45] Date of Patent: Jan. 5, 1988

[54] PNEUMATIC TIME DELAY VALVE

[75] Inventors: Martin R. Richmond, Lexington, Mass.; Mark A. Hayner, Manchester, N.H.

[73] Assignee: Sanders Associates, Inc., Nashua, N.H.

[21] Appl. No.: 889,971

[22] Filed: Jul. 18, 1986

Related U.S. Application Data

[62] Division of Ser. No. 597,943, Apr. 9, 1984, Pat. No. 4,646,644.

[51] Int. Cl.[4] ............................................. F16K 21/10
[52] U.S. Cl. .................................. 137/514.5; 137/514; 251/55; 188/284
[58] Field of Search ................... 137/514, 514.3, 514.5, 137/514.7; 251/48, 55; 188/284, 288

[56] References Cited

U.S. PATENT DOCUMENTS

| | | | |
|---|---|---|---|
| 1,332,938 | 11/1919 | Parker | 137/514.7 |
| 1,887,078 | 11/1932 | Wheaton | 251/48 |
| 1,950,685 | 3/1934 | McGee | 188/288 |
| 2,243,711 | 5/1941 | Lamb | 137/514.7 X |
| 3,618,690 | 11/1971 | Johnson | 137/514.7 |
| 3,913,901 | 10/1975 | Molders | 188/284 X |

FOREIGN PATENT DOCUMENTS 1057842  5/1959  Fed. Rep. of Germany ...... 188/288

Primary Examiner—Alan Cohan
Assistant Examiner—John A. Rivell
Attorney, Agent, or Firm—Richard I. Seligman

[57] ABSTRACT

A pneumatic time delay valve primarily adapted for use in the ejection system of electronic or optical countermeasure devices and the like wherein an explosive squib is employed to create a momentary charge of high pressure gas used to depress the firing pin on the device to activate the device and also to push the device out of an ejection tube. The invention comprises means for splitting the pressurized gas into a first conduit communicating with the firing pin and a second conduit communicating with the device to apply the ejection pressure thereon and a time delay valve disposed within the second conduit for delaying the application of the gas to the device. During the time delay period, a piston is forced down a cylindrical bore forcing metering fluid through an orifice. At the end of the time delay period, the metering fluid is allowed to bypass the piston, causing the piston to move rapidly to open an outlet port putting the pressurized gas virtually instantaneously in communication with the device to force it out of the launch tube.

1 Claim, 9 Drawing Figures 4,716,930

PNEUMATIC TIME DELAY VALVE

This is a division of application Ser. No. 597,943 filed Apr. 9, 1984 now U.S. Pat. No. 4,646,644.

BACKGROUND OF THE INVENTION

The present invention relates to time delay devices and, more particularly, to a time delay valve disposed in a pneumatic line between an inlet and outlet port and having a moving piston for moving slowly through a first portion of travel by forcing an incompressible metering fluid thtough an orifice and rapidly through a second portion by dumping the metering fluid around the piston to rapidly expose the outlet port to the presurized gas at the end of the time delay period.

Electronic and optical countermeasure devices and the like are carried by many aircraft flying through hostile environments. The devices are carried within launch tubes on the aircraft and include thermal batteries for powering the electronics contained therein. Upon the detection of an approaching hostile missile, the device is launched to decoy the missile away from the aircraft. To activate and eject the device, an explosive squib is typically ignited causing a charge of presurized gas to be created within the launch tube. The pressurized gas serves two functions. First, it depresses a firing pin to start the pyrotechnic battery contained within the device. This causes the battery to begin electrical operation to power the electronics. Secondly, it creates a pushing force on the device to launch it from the tube. Typically, the battery is divided into two portions; a main portion which powers the electronics for the majority of their limited operational life and a second, rapid start up section, which comes up to operating potential very rapidly so as to have the electronics operational at the time that the ejection of the device from the tube occurs.

While the foregoing battery and ejection arrangement works successfully for its intended purpose, it is not without its drawbacks. First, the rapid start up battery section is very costly. Second, the rapid start up battery section is large and, therefore, occupies space that could be put to better use in improving the performance and capability of the countermeasure device. The time for the main battery to reach its operating potential is small but sufficient to create operating difficulties if a rapid start up section is not employed in conventional launch systems. If a slight delay could be effected between the time that the firing pin is depressed and the device is launched from the tube, the rapid start up battery section could be eliminated with attendant benefits.

Wherefore, it is the object of the present invention to provide a means for effecting such a time delay in the launch systems of such electronic countermeasure devices.

It is a further object of the present invention to effect such a time delay in a manner which requires minimum changes to the aircraft launch system and no changes to the electronic countermeasure devices presently in use, such that benefits but no waste will be created by the availability of the present invention.

SUMMARY

The foregoing objectives have been met in an ejection system for launching an electronic device from a tube wherein an explosive squib is fired to create a charge of high pressure gas within the tube which gas depresses a firing pin on the device to activate the device and then pushes the device out of the tube by the improvement of the present invention for providing a time delay between the time the firing pin is depressed by the gas and the time the device is pushed out of the tube by the gas sufficient to allow the electronics of the device to become operational comprising means for splitting the pressurized gas into a first conduit communicating with the firing pin and a second conduit communicating with the device to apply a pushing pressure thereon; and, time delay valve means disposed within the second conduit for delaying the application of the gas to the device.

In the preferred embodiment, the time delay valve means includes means for totally opening the valve means instantaneously at the end of the time delay whereby the majority of the limited charge of gas available is applied as a single pulse force on the device such that it is effectively ejected from the tube.

DESCRIPTION OF THE PREFERRED EMBODIMENT

Figure 1:
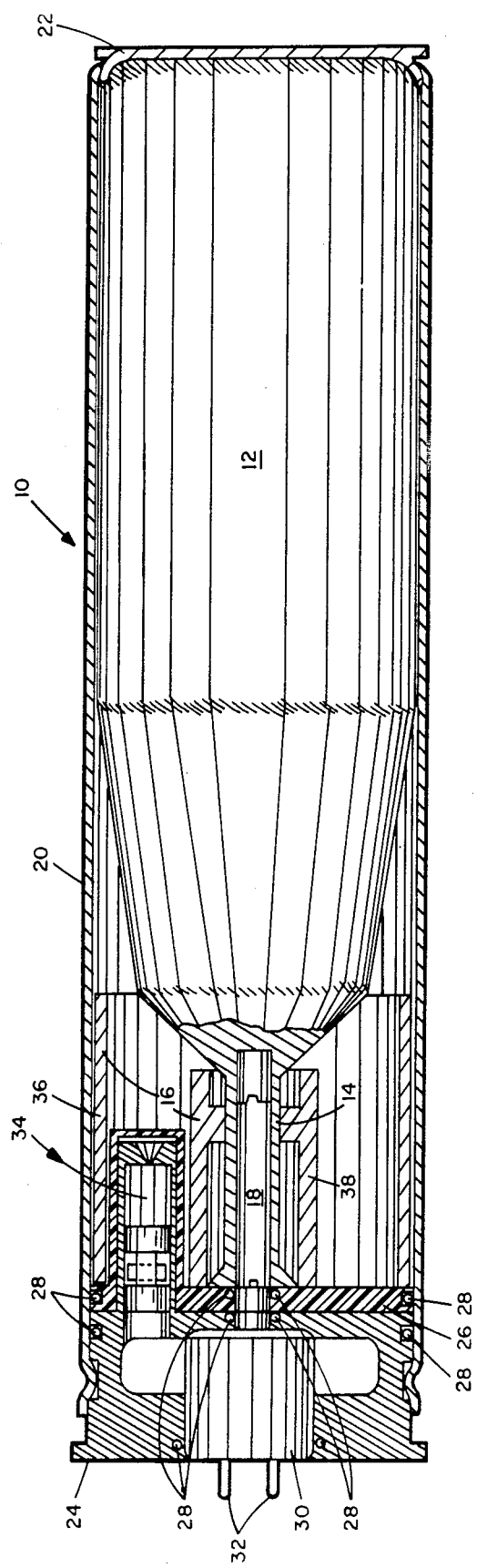
FIG. 1 is a partially cutaway side view through an electronic countermeasure device disposed within its launch tube and including the time delay device of the present invention.

Turning first to FIG. 1, the environment of the present invention is shown. The countermeasure device is generally indicated as 10 and includes a cylindrical body portion 12 having a hollow stem 14 at the rear thereof. A cylindrical fin section 16 is slidably mounted on the stem. Firing pin 18 is disposed with the stem 14. The launch tube 20 has a sealing cap 22 on the outer end and an igniter cap 24 in the inner end. Pressure seal 26 is disposed between the igniter cap 24 and the fin portion 16 for sealing purposes to prevent leakage of the high pressure gas which is formed in undesired directions. O-rings 28 are also placed as shown for leakage prevention.

The source of the high pressure gas is the explosive squib 30 in the igniter cap 24 which is ignited when an appropriate electric charge is connected across the pins 32. The time delay valve of the present invention is generally indicated as 34 and as can best be seen in FIG. 2, it is designed to fit in the space between the outer cylindrical wall 36, the inner sliding hub 38, and a pair of adjacent radial fins of the fin portion 16. Thus, as desired, no change need be made to the basic configuration of the countermeasure device 10 to employ the present invention. The only change to the device 10 is internal and comprises the desired removal of the rapid start up battery and its replacement with either additional electronics or additional battery capability affording diverse additional electronic capabilities, higher power levels, or additional operational time.

Figure 2:
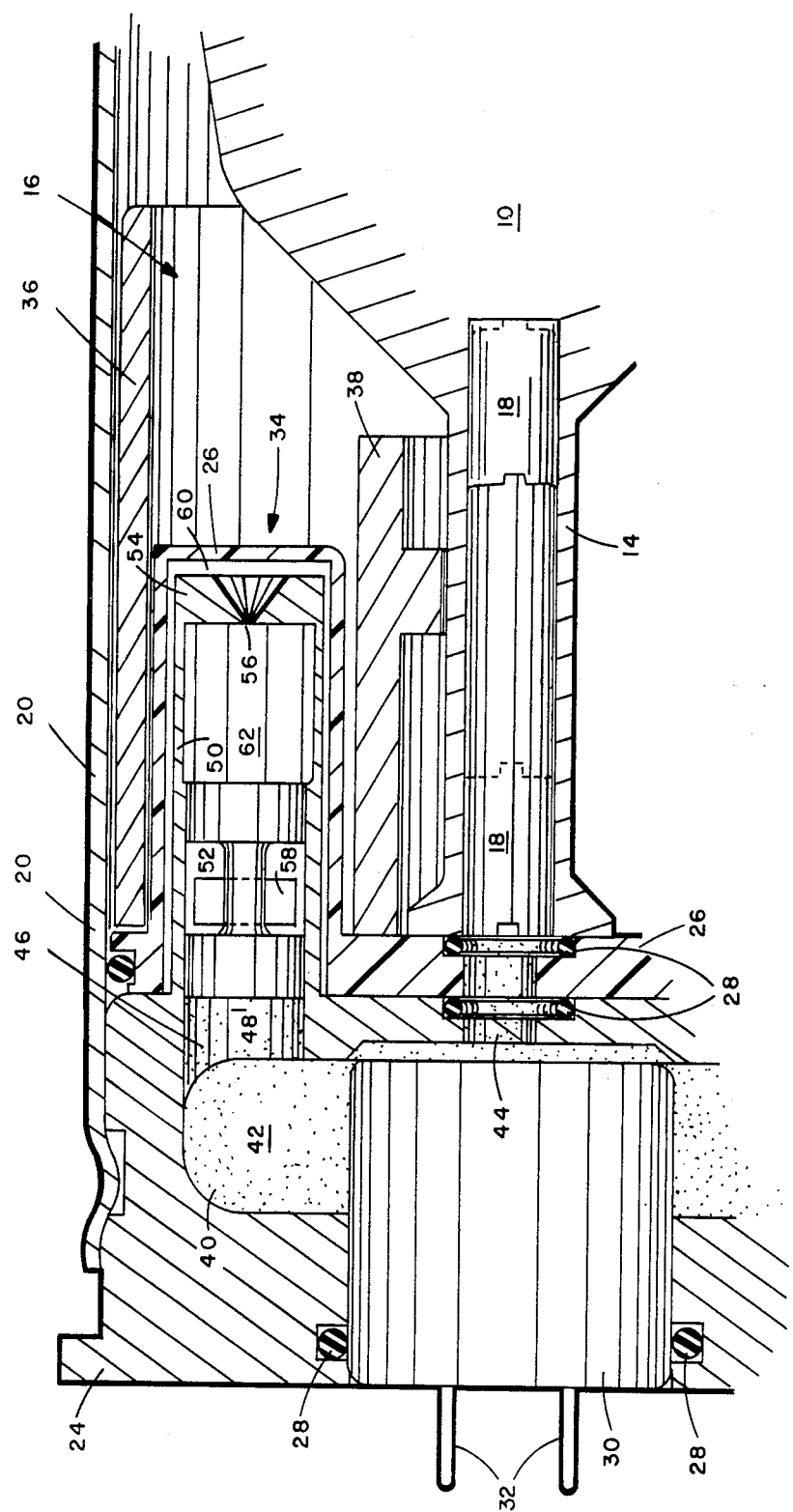
FIG. 2 is an enlarged view of the apparatus of FIG. 1 in the area of the present invention.

Turning now to FIG. 2, the basic operation of the present invention can be seen. When the explosive squib 30 is activated, high pressure gas 40 is created within the storage area 42 of the igniter cap 24; that is, the igniter cap 24 is suddenly turned into a small bottle of pressurized gas which is available for its intended purpose. The exit from the storage area 42 is split into two paths. A first bore 44 acts as a conduit in communication with the hollow stem 14 and the firing pin 18. A second bore 46 is in communication with the inlet opening 48 of the device of the present invention. Time delay valve 34 comprises a cylindrical body portion 50 mounted onto the igniter cap 24 so as to define a cylinder bore 52 therein having its inlet opening 48 in communication with the high pressure gas 40 within the storage area 42 when it is created therein by the activation of the squib 30. The opposite end of the cylinder bore 52 is closed by plate 54 having orifice 56 therein. An outlet port 58 is provided in the wall of the body portion 50 such that gas 40 can pass through the second bore 46, through inlet opening 48, down the cylinder bore 52 and out the outlet port 58 into the area 60 behind the pressure seal 26 at the rear of the device 10 to effect the pushing ejection force thereon.

Figure 3:
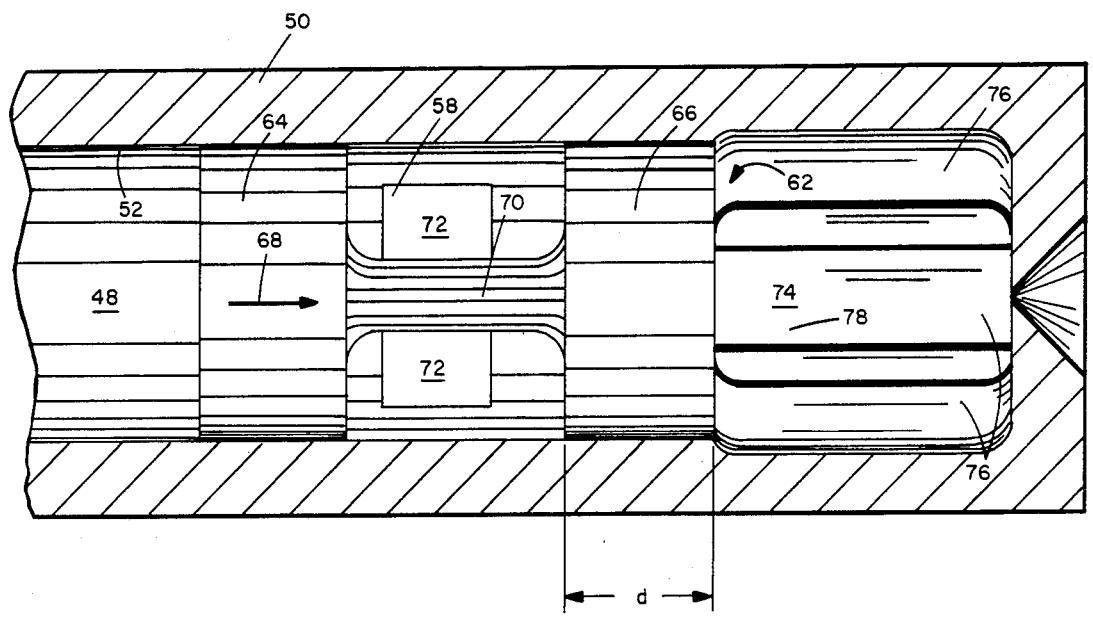
FIG. 3 is a detailed drawing of the delay valve of the present invention in its initial or starting position.

To effect the purposes of the present invention in delaying the application of that force, however, a piston member 62 is positioned within the cylinder bore 52 in the manner shown in greater detail in FIG. 3. Piston member 62 includes a first portion 64 on one end and a second portion 66 on the opposite end which are sized to be in sealed sliding relationship within the cylinder bore 52. As thus configured, the piston member 62 is a hydraulic fit and can slide longitudinally down the cylinder bore 52 in the direction of arrow 68 from the force of the high pressure gas 40 thereon without gas 40 passing around the portions 64, 66. Portions 64, 66 are separated by an air filled low pressure middle portion 70 of reduced diameter which creates a space 72 between middle portion 70 and the inner wall of cylinder bore 52, the purpose of which will become apparent shortly in its initial position of FIG. 3, the piston member 62 has a space between the second portion 66 and the plate 54 containing the orifice 56 such that a chamber 74 is defined thereby. The side walls of the cylinder bore 52 within the chamber 74 contain longitudinal grooves 76 whose purpose will also be seen shortly. The chamber 74 is filled with an incompressible metering fluid 78. The density of the metering fluid 78 in combination with the diameter of the orifice 56 and square root of the pressure on the piston member 62 determines the rate of movement of the piston member 62. The rate of movement of the piston member 62 in combination with the length "d" of the second portion 66 determine the time delay of the valve 34. It should be noted that portions 64 and 66 need not be of the same diameter and, in fact, for very high pressure applications it may be advantageous to have portion 66 larger so that the orifice need not be so tiny and thereby becomes less critical.

Figure 4:
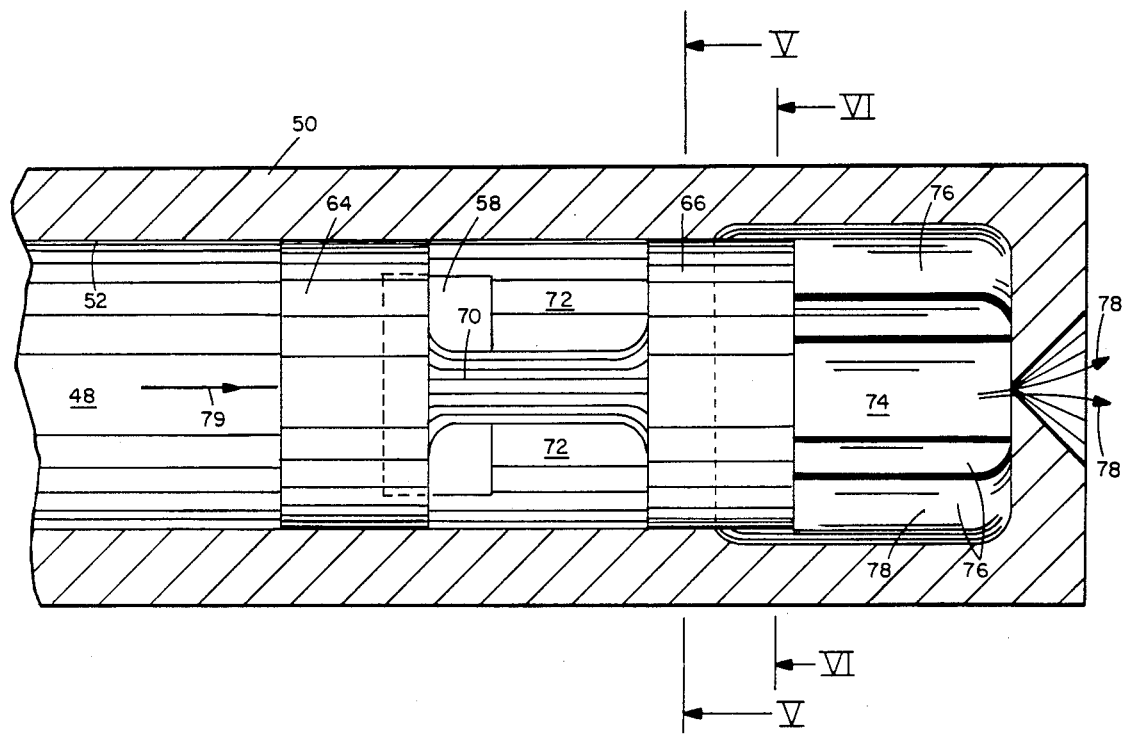
FIG. 4 shows the valve of FIG. 4 during its linear movement effecting the time delay.

Turning next briefly to FIG. 4, the action of the piston member 62 during the time delay process is shown.

Figure 5:
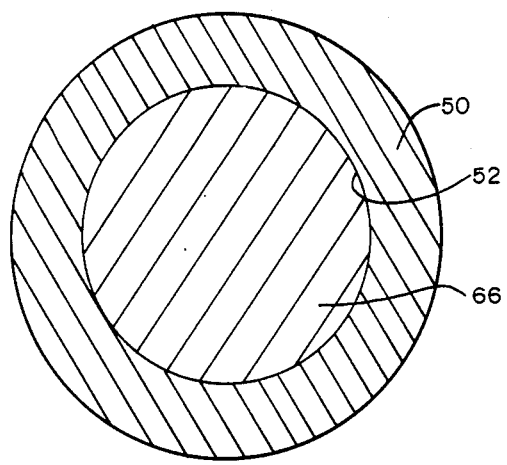
FIG. 5 is a cutaway view of FIG. 4 in the plane V-V.
Figure 6:
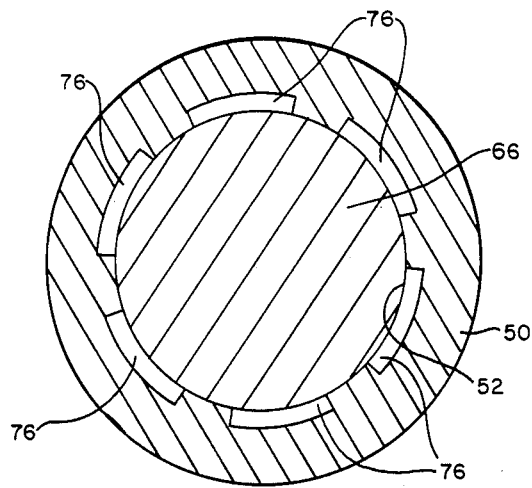
FIG. 6 is a cutaway view of FIG. 4 in the plane VI-VI.

When the explosive squib 30 is detonated, the high pressure gas 40 immediately passes through the first bore 44 to apply activating pressure to the firing pin 18. Simultaneously, the gas 40 passes through the second bore 46 to apply pressure to the first portion 64 of the piston member 62 as indicated by the arrow 79. As can be seen, the first portion 64 is disposed in a sealed slidable position between the inlet opening 48 from the second bore 46 and the outlet port 58. Consequently, the gas 40 is prevented from exiting through the outlet port 58 to enter area 60 and apply ejection pressure to the device 10. Since the piston member 62 is slidable, however, it begins sliding in the direction of arrow 68 causing the metering fluid 78 to be forced out of the orifice 56 at the predetermined rate. As can be seen in FIGS. 5 and 6, as portion 66 moves longitudinally into chamber 74 and portion 66 moves along the grooves 76 as shown in FIG. 6 but the rear of second portion 66 maintains a sealed relationship with cylinder bore 52 as shown in FIG. 5.

Figure 7:
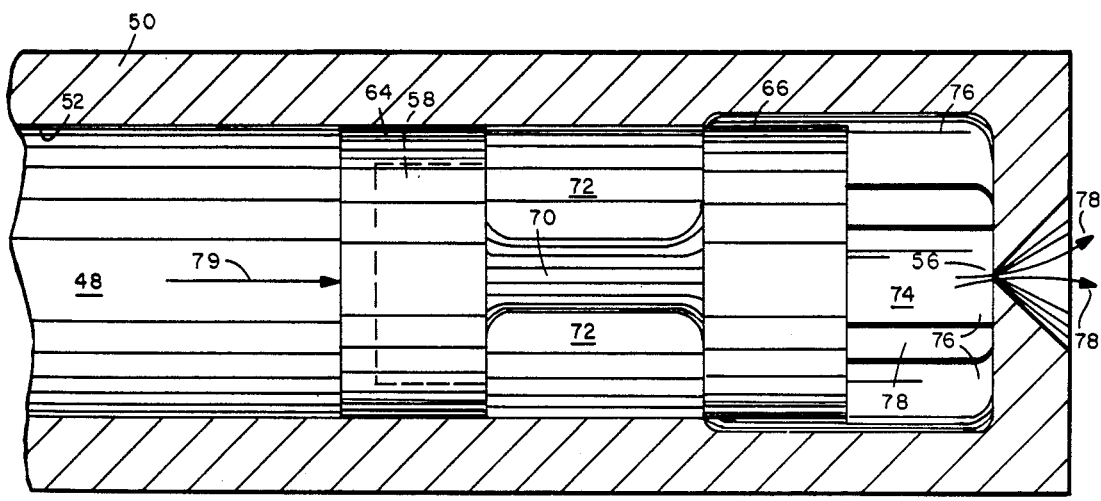
FIG. 7 shows the valve of FIG. 3 at the point in its linear movement at the end of the time delay.

Turning now to FIG. 7, at the end of the time delay period, the piston member 62 arrives at the position shown in FIG. 7 wherein the innermost edge of the second portion 66 is adjacent the inner edge of the longitudinal grooves 76. As will be noted, the first portion 64 is also still blocking any communication between the second bore 46 and the outlet port 58. Additionally, the inner edge of first portion 64 is adjacent the inner edge of the outlet port 58 thus insuring that air filled space 72 will not fill with high pressure gas 40. This condition is essential to the trigger action release now to be described which is required for proper expulsion pressure.

Figure 8:
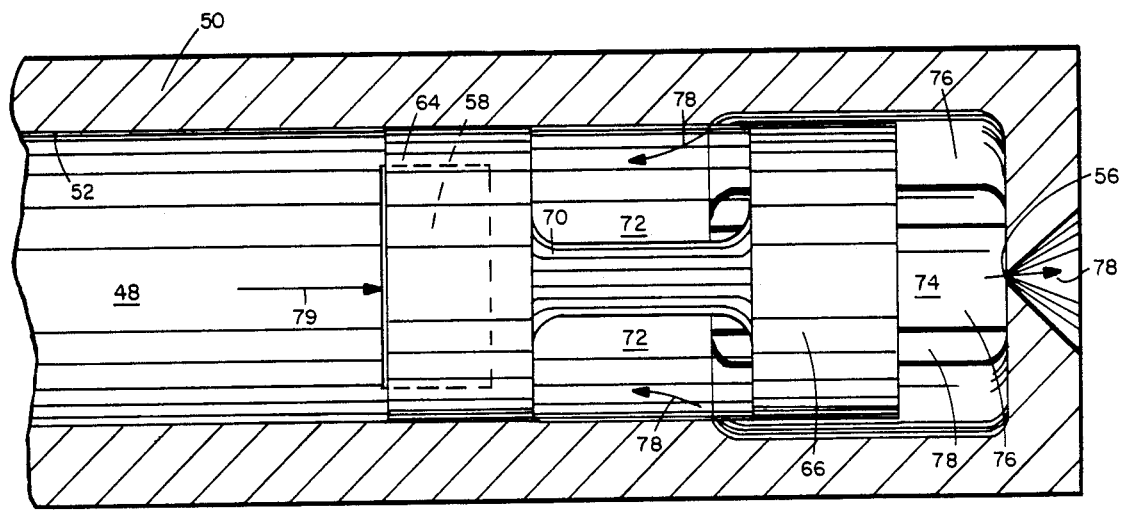
FIG. 8 shows the valve of FIG. 3 and its manner of moving quickly from its position of FIG. 7 to the end of its travel to effect the single pulse force required to eject the device.
Figure 9:
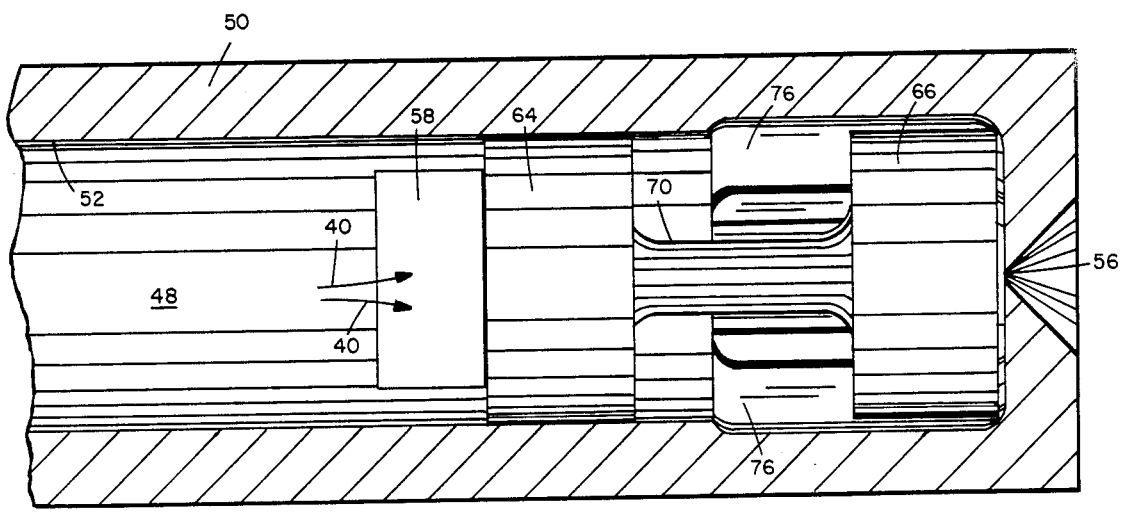
FIG. 9 shows the valve of FIG. 3 at the end of its travel with the path between the inlet and outlet port open.

As further longitudinal movement of the piston member 62 takes place, the condition of FIG. 8 is created. The longitudinal grooves 76 are placed in communication with the space 72 adjacent the middle portion 70 whereupon the metering fluid 78 is no longer required to pass out of the orifice 56, but, rather, can dump around the second portion 66 of piston member 62 into low pressure air filled space 72. This suddenly allows the piston member 62 to move rapidly towards plate 54, thus virtually instantaneously exposing the outlet port 58 to place it in communication with the second bore 46. Accordingly, the high pressure gas 40 is able to move quickly into area 60 to effect a single pulse force on the rear of body portion 12 of device 10 to eject it from the launch tube 20.

From the foregoing, it can be seen that the time delay valve of the present invention achieves its stated objectives by providing a time delay which can be used in conjunction with launchable countermeasure devices without having to change the devices.

Additionally, those skilled in the art will recognize that the time delay valve of the present invention can be used for other purposes wherein it is desired to insert a time delay within a pneumatic line connected between a source of high pressure fluid and a device to be activated thereby.

Wherefore, having thus described our invention, we claim:

1. A pneumatic time delay valve for insertion in a pneumatic line between a source of pressurized gas and a device to be activated thereby, comprising:
   (a) a body member having an elongated cylinder bore therein, an inlet opening to said cylinder bore on one end thereof adapted for connection to the source of pressurized gas, an orifice communicating with said cylinder bore on the other end thereof, and an outlet port disposed between said inlet opening and said orifice and communicating between said cylinder bore and the device to be activated;

(b) a piston member disposed within said cylinder bore and having first and second ends sized and shaped for sealed longitudinal sliding movement within said cylinder bore and having a middle segment of reduced diameter between said ends providing space between said piston member and the side walls of said cylinder bore, said piston member being initially disposed in a starting position with said first end adjacent said inlet opening, said second end spaced from said orifice opening to provide a chamber within said cylinder bore between said orifice opening and said second end, and said outlet port disposed between said first and second ends adjacent said middle segment;

(c) an incompressible metering fluid disposed within said chamber; and wherein, (d) the side walls of said cylinder bore defining said chamber have longitudinal grooves therein; and additionally, (e) said above-described components are sized and positioned such that when the pressurized gas is applied to said inlet opening, the pressure thereof tends to urge said piston member longitudinally within said cylinder bore towards said orifice forcing said metering fluid out of said chamber through said orifice at a rate which determines the time delay of the valve, when the delay is complete the piston member will have reached a point where communication between said inlet end and said outlet port is still blocked by said first end and said second end is adjacent the inner ends of said longitudinal grooves whereby further movement of said piston member causes said grooves to be placed into communication with said middle segment and said metering fluid can move rapidly through said grooves into said middle segment instead of through said orifice thus allowing said piston member to move rapidly through the remaining distance of its travel so that said outlet port is put suddenly in total communication with said inlet end applying the pressurized gas to the device to be activated at the end of the time delay period.

* * * * *